United States Patent
Gong et al.

(10) Patent No.: US 9,497,130 B2
(45) Date of Patent: *Nov. 15, 2016

(54) DEVICE, SYSTEM AND METHOD OF SELECTIVELY ABORTING RECEPTION OF WIRELESS COMMUNICATION PACKETS

(71) Applicant: INTEL CORPORATION, Santa Clara, CA (US)

(72) Inventors: Michelle Xiaohong Gong, Sunnyvale, CA (US);
(Continued)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/444,230

(22) Filed: Jul. 28, 2014

(65) Prior Publication Data
US 2015/0023337 A1    Jan. 22, 2015

Related U.S. Application Data

(63) Continuation of application No. 12/581,139, filed on Oct. 18, 2009, now Pat. No. 8,817,698.

(51) Int. Cl.
*H04L 12/823* (2013.01)
*H04W 52/02* (2009.01)
(Continued)

(52) U.S. Cl.
CPC ............... *H04L 47/32* (2013.01); *H04L 45/74* (2013.01); *H04L 69/22* (2013.01);
(Continued)

(58) Field of Classification Search
CPC ..................... H04L 45/74; H04L 47/14; H04L 47/32; H04L 69/22; H04W 52/0238;
(Continued)

(56) References Cited

U.S. PATENT DOCUMENTS 7,324,605 B2 * 1/2008 Maltsev ............... H04L 27/26
375/260
7,817,593 B2 * 10/2010 Ginzburg .............. H04L 69/18
370/311
(Continued)

FOREIGN PATENT DOCUMENTS

CN        1480854       3/2004
JP       2004297394    10/2004
(Continued)

OTHER PUBLICATIONS

IEEE Std 802.3™—2008, IEEE Standard for Information technology—Telecommunications and information exchange between systems —Local and metropolitan area networks —Specific requirements Part 3: Carrier sense multiple access with Collision Detection (CSMA/CD) Access Method and Physical Layer Specifications, 671 pages.

(Continued)

*Primary Examiner* — Luat Phung
*Assistant Examiner* — Saad A Waqas
(74) *Attorney, Agent, or Firm* — Shichrur & Co.

(57) ABSTRACT

Some demonstrative embodiments include devices, systems and/or methods of selectively aborting reception of wireless communication packets. For example, a receiver may at least partially process a portion of a wireless communication packet, to determine based on the portion of the communication packet whether the packet is intended to be received by the receiver and, if the packet is not intended to be received by the receiver, to abort processing of a remainder of the communication packet by one or more components of a physical layer of the receiver. Other embodiments are described and claimed.

20 Claims, 5 Drawing Sheets

(72) Inventors: Eldad Perahia, Hillsboro, OR (US);
Tsung-Yuan Tai, Portland, OR (US)

(51) Int. Cl.
| | |
|---|---|
| *H04L 29/06* | (2006.01) |
| *H04L 12/741* | (2013.01) |
| *H04W 84/12* | (2009.01) |
| *H04W 88/02* | (2009.01) |
| *H04L 12/801* | (2013.01) |

(52) U.S. Cl.
CPC ......... *H04W 52/0238* (2013.01); *H04W 84/12* (2013.01); *H04W 88/02* (2013.01); *H04L 47/14* (2013.01)

(58) Field of Classification Search
CPC ............... H04W 52/028; H04W 84/12; H04W 88/02
USPC ........................................................ 370/328
See application file for complete search history.

(56) References Cited

U.S. PATENT DOCUMENTS

| | | | |
|---|---|---|---|
| 8,817,698 | B2 | 8/2014 | Gong et al. |
| 2005/0165950 | A1* | 7/2005 | Takagi .................. H04L 12/413 709/236 |
| 2005/0226204 | A1* | 10/2005 | Uehara ................. H04W 99/00 370/349 |
| 2005/0254465 | A1 | 11/2005 | Lundby et al. |
| 2006/0018268 | A1* | 1/2006 | Kakani ................. H04W 28/06 370/278 |
| 2006/0072614 | A1 | 4/2006 | Ogiso et al. |
| 2007/0058575 | A1* | 3/2007 | Kwon ............... H04W 52/0238 370/318 |
| 2007/0086417 | A1 | 4/2007 | Jang et al. |
| 2008/0036909 | A1* | 2/2008 | Paila .................... H04H 20/426 348/461 |
| 2008/0181155 | A1* | 7/2008 | Sherman ........... H04W 52/0229 370/311 |
| 2009/0040965 | A1* | 2/2009 | Matsuo ................. H04W 76/04 370/328 |

FOREIGN PATENT DOCUMENTS

| | | |
|---|---|---|
| JP | 2004356838 | 12/2004 |
| JP | 2005184839 | 7/2005 |
| JP | 2005303585 | 10/2005 |
| JP | 2007019773 | 1/2007 |
| JP | 2008141372 | 6/2008 |
| JP | 2009044650 | 2/2009 |
| JP | 2009512385 | 3/2009 |
| JP | 2009147786 | 7/2009 |
| KR | 10-2006-0098695 | 9/2006 |

OTHER PUBLICATIONS

IEEE Std 802.11™—2007 (Revision of IEEE Std 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications, 1232 pages.

IEEE P802.11n™/D2.00, Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Enhancements for Higher Throughput, Feb. 2007, 498 pages.

International Search Report and Written Opinion for PCT/US2010/048875, mailed on May 20, 2011, 9 pages.

International Preliminary Report on Patentability for PCT/US2010/048875, mailed on May 3, 2012, 6 pages.

Office Action for Japanese Patent Application No. 2012-534199, mailed Jul. 30, 2013, 4 pages, including 2 pages of English translation.

Office Action for Japanese Patent Application No. 2012-534199, mailed on Nov. 26, 2013, 6 pages, including 3 pages of English translation.

Office Action for Japanese Patent Application No. 2012-534199, mailed on Jul. 15, 2014, 5 pages, including 2 pages of English translation.

Final Office Action for U.S. Appl. No. 12/581,139, mailed on Jul. 2, 2013, 37 pages.

Office Action for U.S. Appl. No. 12/581,139, mailed on Jan. 7, 2013, 42 pages.

Office Action for U.S. Appl. No. 12/581,139, mailed on Jan. 16, 2014, 54 pages.

Office Action for Chinese Patent Application No. 201210520814.9, mailed on Oct. 24, 2014, 13 pages, including 7 page of English translation.

Extended Search Report for European Patent Application No. 10823798.3, mailed on Feb. 23, 2015, 8 pages.

Office Action for Chinese Patent Application No. 201210520814.9, mailed on Jul. 13, 2015, 12 pages, including 7 pages of English translation.

Office Action for Japanese Patent Application No. 2015-005969, mailed on Sep. 8, 2015, 11 pages (including 6 pages of English translation).

Office Action for Chinese Patent Application Serial No. 201210520814.9, mailed on Jan. 22, 2016, 10 pages, including 4 pages of English translation.

Office Action for Japanese Patent Application Serial No. 2015-005969 mailed on Apr. 5, 2016, 6 pages (Including 3 pages of English translation.).

\* cited by examiner

DEVICE, SYSTEM AND METHOD OF SELECTIVELY ABORTING RECEPTION OF WIRELESS COMMUNICATION PACKETS

BACKGROUND

The battery life of cellular telephone devices having Wireless Local Area Network (WLAN) capabilities, in terms of standby time or talk time, is generally much shorter than the battery life of comparable cellular telephones devices that do not have WLAN capabilities. In addition to other factors, random access mechanisms utilized by WLAN systems, is a major contributor to the fast battery drainage of such devices. Some networking systems, such as systems in accordance with the IEEE 802.11 and 802.3 standards, rely on carrier-sense multiple access (CSMA) for channel access. In these systems, when one node (e.g., a wireless device) transmits communication packets, all nodes (e.g., wireless devices) within range of the transmitting node/device receive the packets. Then, in many systems, each node/device decodes the entire packet, e.g., by processing the entire packet at a Physical Layer (PHY) of the decoding device, and checks. After decoding the entire packet, a Medium Access Control (MAC) layer of the decoding device checks, for example, a MAC header of the packet, to determine whether the packet is intended for the decoding node, e.g., if the packet is a broadcast packet, a multicast packet intended for a network including the decoding node, or a unicast packet intended for reception by the decoding node. If the packet is intended to be received by the decoding node, a lower MAC layer of the decoding device passes the packet to an upper MAC layer for further processing. Otherwise, the lower MAC layer "drops" the packet from further processing. The lower MAC layer is usually implemented in micro-code ("uCode"), whereas the upper MAC layer is usually implemented in a driver of the decoding node/device.

However, in many of today's implementations, the data packet is dropped only after the entire packet has been decoded at the PHY layer and passed to the lower MAC layer. Because the PHY layer usually consumes most of the energy in a communication chipset and because communication chipsets generally spend more time receiving than transmitting, the energy consumed by reception of irrelevant packets has become a particularly significant factor in battery drainage. Furthermore, the trend of increased energy consumption in reception of irrelevant packets is becoming even more significant with the development of new communication devices with advanced capabilities that are able to receive larger communication packets.

Many packets are long packets, containing a substantial amount of information. For example, some communication technologies, such as the IEEE 802.11 and 802.3 standards, can transmit jumbo frames. For example, the IEEE 802.11n standard defines two frame aggregation schemes, that is, A-MSDU and A-MPDU, which have a frame size limit of 4K or 8K octets and 65,535 octets respectively.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

The terms "powering down" and "power down" as used herein with relation to a device and/or a component may refer, for example, to reducing, diminishing, shutting down, powering off, turning off and/or switching off the electrical current to the device and/or component, and/or to switching the device and/or component to operate at a sleep mode, a reduced-power mode, a stand-by mode and/or any other operation mode which consumes less power than required for full and/or normal operation of the device and/or component. For example, powering down a receiver, a component of a receiver, a Physical Layer (PHY) of a receiver, a Radio-Frequency (RF) component of a receiver, and/or a Baseband (BB) component of a receiver may include reducing, diminishing, shutting down, powering off, turning off and/or switching off the electrical current to the receiver, the component of the receiver, the PHY of the receiver, the RF component of the receiver, and/or the BB component of the receiver; and/or to switching the receiver, the component of the receiver, the PHY of the receiver, the RF component of the receiver, and/or the BB component of the receiver to operate at a sleep mode, a reduced-power mode, a stand-by mode and/or any other operation mode which consumes less power than required for full operation, e.g., for full reception, handling, decoding and/or processing wireless communication signals.

The terms "powering up" and "power up" as used herein with relation to a device and/or a component may refer, for example, to enhancing, resuming, turning on and/or switching on the electrical current to the device and/or component and/or to changing the device and/or component from sleep mode, stand by mode or any other operation mode, which consumes less power than required for full reception and/or normal operation of the device and/or component, to operational mode. For example, powering up a receiver, a component of a receiver, a PHY of a receiver, a RF component of a receiver, and/or a BB component of a receiver may include enhancing, resuming, turning on and/or switching on the electrical current to the receiver, the component of the receiver, the PHY of the receiver, the RF component of the receiver, and/or the BB component of the receiver; and/or to changing the receiver, the component of the receiver, the PHY of the receiver, the RF component of the receiver, and/or the BB component of the receiver from sleep mode, a reduced-power mode, a stand-by mode and/or any other operation mode which consumes less power than required for full operation to operational mode, e.g., for full reception, handling, decoding and/or processing wireless communication signals.

The term "portion of a packet" may refer, for example, to a header of a packet, a preamble of a packet and/or to any other suitable part, segment, and/or fragment of a packet, which contains information regarding the packet and/or regarding the content of the packet. For example, the portion of the packet may include a physical layer convergence procedure (PLCP) header of the packet, a Medium Access Control (MAC) header of the packet, a PLCP preamble of the packet, and the like.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (IEEE 802.11-1999: *Wireless LAN Medium Access Control (MAC) and Physical Layer (PHY) Specifications*), 802.11a, 802.11b, 802.11g, 802.11h, 802.11j, 802.11n, 802.16, 802.16d, 802.16e, 802.16f, standards ("the IEEE 802 standards") and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like.

Figure 1:
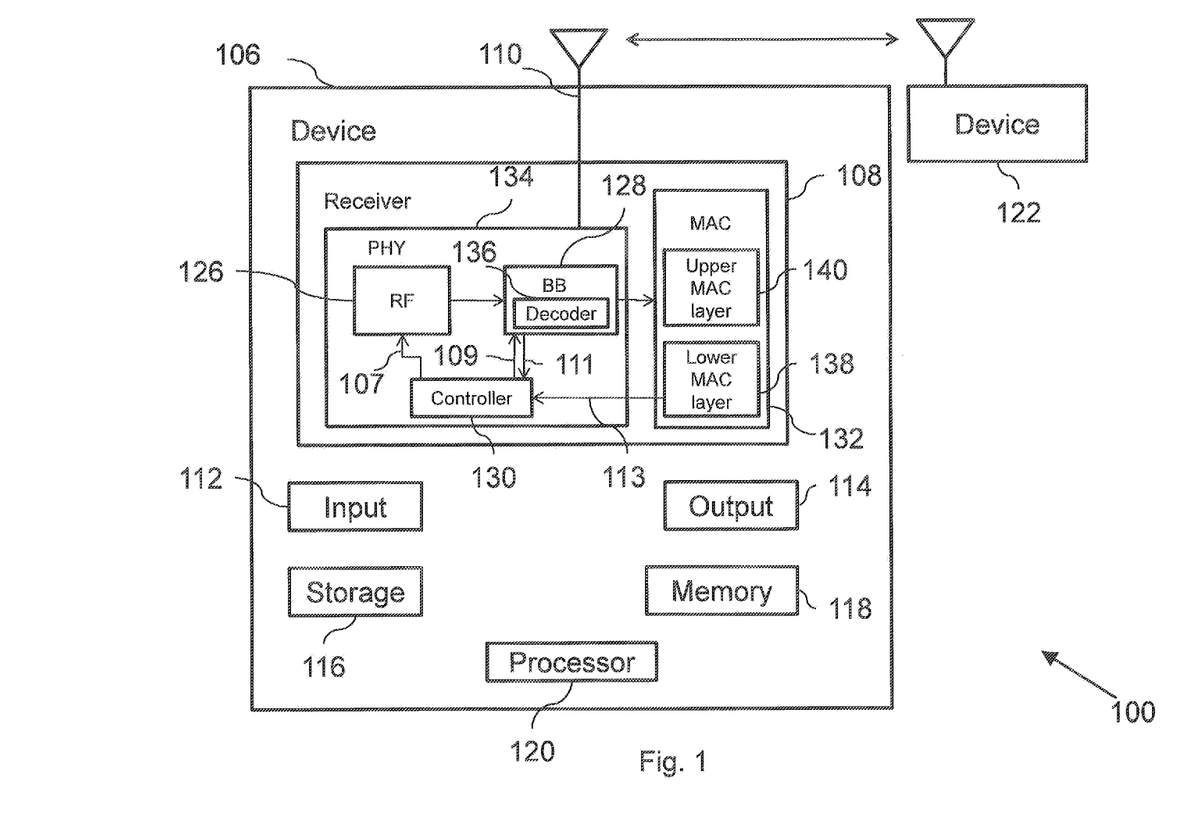
FIG. 1 is a schematic block diagram illustration of a system, in accordance with some demonstrative embodiments.

Reference is now made to FIG. 1, which schematically illustrates a block diagram of a system 100 in accordance with some demonstrative embodiments.

In some demonstrative embodiments, one or more elements of system 100 may be capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

As shown in FIG. 1, in some demonstrative embodiments, system 100 may include two or more devices, which communicate in a wireless manner to transfer data.

In some demonstrative embodiments, system 100 may include at least one wireless communication device ("station"), e.g., device 106 and/or 122, which may include a receiver 108 capable of receiving wireless communications packets from one or more other devices of system 100.

In some demonstrative embodiments, wireless communication devices 106 and/or 122 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, devices 106 and/or 122 may include, for example, one or more of a processor 120, an input unit 112, an output unit 114, a memory unit 118, and a storage unit 116. Device 106 may optionally include other suitable hardware components and/or software components. In some demonstrative embodiments, some or all of the components of device 106 may be enclosed in a common housing or packaging, and may be interconnected or operably associated using one or more wired or wireless links In other embodiments, components of device 106 may be distributed among multiple or separate devices or locations.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of device 106, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display, a Liquid Crystal Display (LCD), an LED display, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, store data processed by device 106.

In some demonstrative embodiments, receiver 108 includes or may be part of, for example, one or more wireless transmitters, receivers and/or transceivers able to send and/or receive wireless communication signals, RF signals, frames, blocks, transmission streams, packets, messages, specific data items, and/or any other type of communication data. For example, receiver 108 may include or may be implemented as part of a suitable wireless communication unit, for example, a suitable wireless Network Interface Card (NIC), and the like.

Receiver 108 may include, or may be associated with, one or more antennas or one or more sets of antennas 110. Antennas 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, receiver 108 may include any suitable PHY 134 and any suitable MAC 132 to process signals of wireless communication packets received by receiver 108. Some wireless communication packets may include relatively long packets, which may contain a significant amount of information and/or data. Some packets received by receiver 108 may be undesired packets and/or packets not intended to be received and/or processed by receiver 108, for example, unicast and/or multicast packets intended for other receivers. Complete processing of such undesired packets by PHY 134 may result in an unnecessary drainage of battery power of device 106.

In some demonstrative embodiments, communication device 106 may abort the processing of a communication packet at the level of PHY 134, and as a result preserve battery power, e.g., as described in detail below.

In some demonstrative embodiments, receiver 108 may be capable of processing a portion of a received communication packet, to determine according to the processed portion whether the communication packet is intended to be received by receiver 108 and, if the communication packet is not intended to be received by receiver 108, to abort processing of a remainder of the communication packet, e.g., of other portions of the packet succeeding the processed portion, by one or more components of PHY 134. For example, receiver 108 may determine that the packet is not intended to be received by receiver 108 based on the processed portion and prior to PHY 134 processing one or more of the other portions of the packet, e.g., as described in detail below.

In some demonstrative embodiments, receiver 108 may abort the processing of the communication packet at the level of PHY 134 by powering down one or more components of PHY 134, e.g., as described in detail below. Receiver 108 may later power up one or more of the components of PHY 134, which were powered down ("the powered-down components"), e.g., in order to receive signals of a successive packet. For example, receiver 108 may determine a time at which the powered-down components are to be powered up based on at least part of the processed portion of the packet, e.g., as described in detail below.

Figure 2:
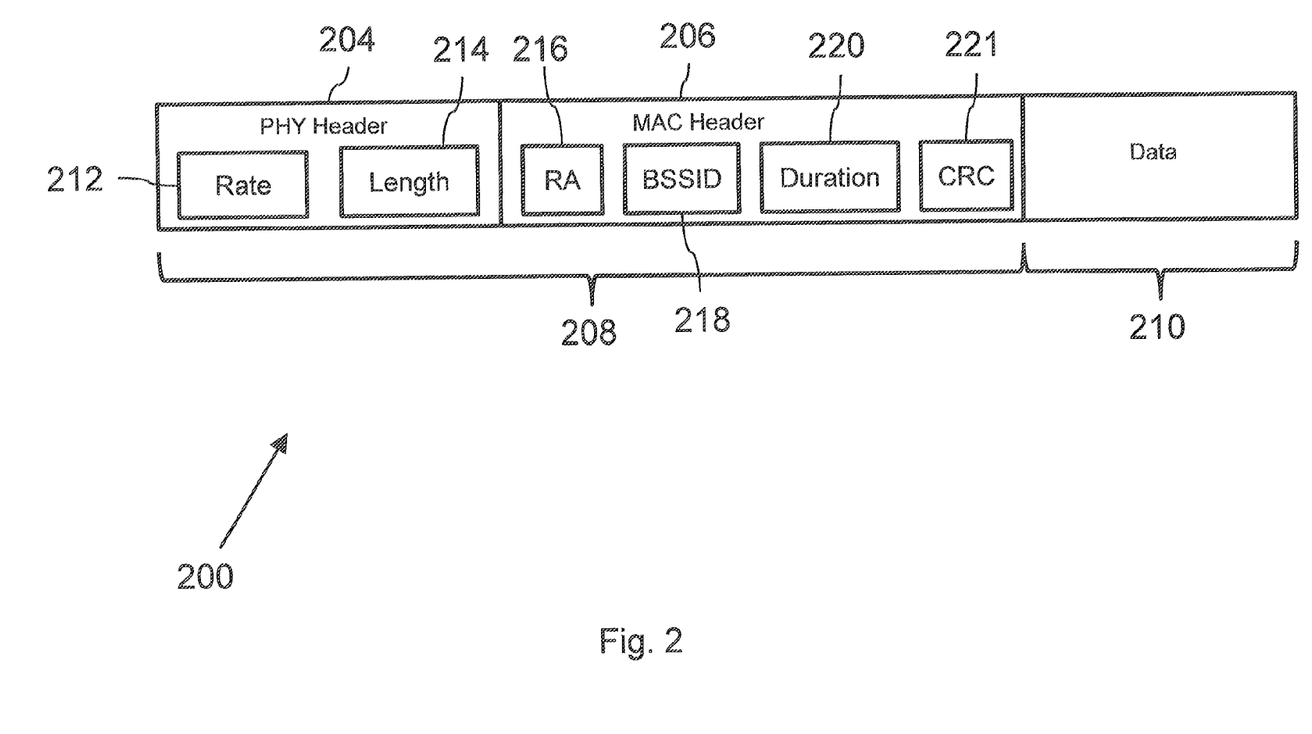
FIG. 2 is a schematic illustration of a wireless communication packet, in accordance with some demonstrative embodiments.

Reference is now made to FIG. 2, which schematically illustrates a simplified block diagram of a wireless communication packet 200, in accordance with some demonstrative embodiments.

In some demonstrative embodiments, wireless communication packet 200 includes a leading portion 208 and a data portion 210.

In some demonstrative embodiments, leading portion 208 includes any suitable information regarding the structure of packet 200 and/or regarding the data contained in data portion 210.

In some demonstrative embodiments, leading portion 208 may include one or more headers, e.g., a first header 204, which may be a suitable PHY header, for example, a PLCP header, and a second header 206, which may be a suitable MAC header. In some demonstrative embodiments, leading portion 208 may additionally or alternatively include a preamble (not shown in FIG. 2), for example, a PLCP preamble as shown and described below with reference to FIG. 4A.

In some demonstrative embodiments, first header 204 and/or second header 206 may include any suitable information regarding the structure of packet 200 and/or regarding the data contained in data portion 210. For example, first header 204 may include a suitable rate field 212, a length field 214 and/or any other suitable field; and/or second header 206 may include a receiver address (RA) 216, a Basic Service Set Identifier (BSSID) 218, a duration field 220 and/or any other suitable field. Rate field 212 may include, for example, a data rate of data portion 210, e.g., in terms of Mega bits per second (Mbps), for example, as described by the IEEE 802 standards and/or any other suitable standard. Length field 214 may include a value representing a length, e.g., in bits and/or bytes, of data portion 210, for example, as described by the IEEE 802 standards and/or any other suitable standard. RA 216 may include a suitable address of one or more destinations intended to receive packet 200, e.g., an individual address or a group address, for example, as described by the IEEE 802 standards and/or any other suitable standard. BSSID 218 may include a value identifying a Basic Service Set (BSS), for example, as described by the IEEE 802 standards and/or any other suitable standard. Duration field 220 may include any suitable value representing a duration and/or length of packet 200, for example, as described by the IEEE 802 standards and/or any other suitable standard.

In some demonstrative embodiments, leading portion 208 may be implemented in accordance with any structure known in the art. For example, first and second headers 204 and 206 of wireless communication packet 200 may be implemented as two separate parts of leading portion 208, e.g., without any overlapping segments or fields, as shown generally in FIG. 2, or they may be implemented as partially or fully overlapping parts of leading portion 208, e.g., with one or more overlapping fields or other segments of leading portion 208.

Referring back to FIG. 1, in accordance with some embodiments, receiver 108 may receive signals of packet 200 (FIG. 2), and may process one or more fields or other segments of leading portion 208 (FIG. 2), e.g., headers 204 and/or 206 (FIG. 2), to determine whether or not communication packet 200 (FIG. 2) is intended to be received by receiver 108, e.g., according to predetermined criteria applied to the one or more processed fields or segments. If the communication packet is not intended to be received by receiver 108, receiver 108 may abort processing of a remainder of the communication packet 200 (FIG. 2) by PHY 134, e.g., by powering down PHY 134 for a period of time corresponding to an anticipated length of the remainder of packet 200 (FIG. 2).

In some demonstrative embodiments, first header 204 (FIG. 2) of packet 200 (FIG. 2) is received and processed by PHY 134. PHY 134 may determine whether packet 200 (FIG. 2) is intended to be received by receiver 108, e.g., based on information contained in first header 204 (FIG. 2). If, after processing first header 204 (FIG. 2), PHY 134 determines that packet 200 (FIG. 2) is not intended to be received by receiver 108, PHY 134 may abort processing of the remainder of packet 200 (FIG. 2), for example, by powering down at least one component of PHY 134, e.g., for a period of time corresponding to the anticipated length of the remainder of packet 200 (FIG. 2), e.g., as described in detail below.

In some demonstrative embodiments, if, after processing first header 204 (FIG. 2), PHY 134 has not conclusively determined that packet 200 (FIG. 2) is not intended to be received by receiver 108, PHY 134 may continue to process a second portion of packet 200 (FIG. 2), e.g., second header 206 (FIG. 2), and transfer the second processed portion for further processing by MAC 132.

In some demonstrative embodiments, MAC 132 may determine whether or not packet 200 (FIG. 2) is intended for receiver 108, e.g., based on one or more fields of second header 206 (FIG. 2). MAC 132 may cause PHY 134 to abort processing of the remainder of packet 200 (FIG. 2), for example, if MAC 132 determines that packet 200 (FIG. 2) is not intended to be received by receiver 108, as explained in more detail below.

In some demonstrative embodiments, PHY 134 may include at least one RF receiving portion 126 and at least one BB portion 128.

In some demonstrative embodiments, receiver 108 may include at least one controller 130 to controllably power down and/or power up one or more components of PHY 134, e.g., one or more components of RF portion 126 and/or BB portion 128, as described in detail below. Controller 130 may be implemented by hardware and/or software and may include any combination of separated or integrated elements. Although in the embodiments shown in FIG. 1, controller 130 may be implemented as part of PHY 134, in other embodiments, the functionality of controller 130 may be incorporated into and/or performed by one or more suitable components of PHY 134 and/or MAC 132.

In some demonstrative embodiments, RF portion 126 is capable of receiving, handling and/or processing signals of incoming packets received via antennas 110. For example, RF portion 126 may include any suitable Low Noise Amplifier (LNA), Band Pass Filter (BPF), Low Pass Filter (LPF), Analog to Digital Convertor (A/D), and/or any other suitable component. After receiving and processing a portion of packet 200 (FIG. 2), RF portion 126 transfers the processed portion to BB portion 128 for further PHY processing.

In some demonstrative embodiments, BB portion 128 is capable of receiving the processed portion of packet 200 (FIG. 2) from RF portion 126 and may include one or more processing units as are known in the art to further process the received portion of packet 200. For example, in some demonstrative embodiments, BB portion 128 may include a Timing and Carrier Recovery (TCR) module (not shown), a Fast Fourier Transform (FFT) module (not shown), an equalizer (not shown), a demodulator (not shown), a de-interleaver (not shown), a decoder 136, and/or a descrambler (not shown) and/or any other suitable component.

In some demonstrative embodiments, controller 130 may determine, e.g., based on information contained in first header 204 (FIG. 2), whether or not packet 200 (FIG. 2) is intended to be received by receiver 108. For example, first header 204 (FIG. 2) is received by device 106 via antenna 110, and is processed by PHY 134. First header 204 (FIG. 2) may be first processed by RF portion 126, then converted from analog to digital format, and transferred to BB portion 128. Controller 130 may receive first header 204 (FIG. 2) from BB portion 128, e.g., from decoder 136, as demonstrated, for example, by signal 111.

In some demonstrative embodiments, if controller 130 determines that packet 200 (FIG. 2) is not intended to be received by receiver 108, controller 130 may cause one or more elements of RF portion 126 and/or BB portion 128 to power down RF portion 126 and/or BB portion 128, thus causing PHY 134 to abort further processing and/or decoding of packet 200 (FIG. 2); and/or to later cause one or more elements of RF portion 126 and/or BB portion 128 to power up, thus causing PHY 134 to resume processing of a next incoming packet. For example, path 107 demonstrates at least one control signal utilized by controller 130 to power down and/or power up at least one component of RF portion 126, and path 109 demonstrates at least one control signal utilized by controller 130 to power down and/or power up at least one component of BB portion 128.

In some demonstrative embodiments, controller 130 may utilize any suitable switch, adjuster, dial, on/off toggle and/or any other mechanism to controllably power down and/or power up one or more components of PHY 134 for example, RF portion 126 and/or BB portion 128 and/or any sub-components thereof, and/or to controllably disable/enable the activity of any timing mechanism of PHY 134, e.g., a clock.

In some demonstrative embodiments, controller 130 may determine whether or not packet 200 (FIG. 2) is intended to be received by receiver 108 based on rate field 212 (FIG. 2) and/or length filed 214 (FIG. 2). For example, controller 130 may determine that packet 200 (FIG. 2) is not intended to be received by receiver 108 if rate field 212 (FIG. 2) includes a rate, which is not supported by receiver 108. In one example, controller 130 may determine that packet 200 (FIG. 2) is not intended to be received by receiver 108 if rate field 212 indicates a data rate, e.g., 5.5 Mbps, which is not supported by receiver 108, e.g., if receiver 108 supports data rates of 11 Mbps.

In some demonstrative embodiments, PHY 134 may process a second portion of packet 200 (FIG. 2), for example, second header 206 (FIG. 2), and pass the second portion for further processing by additional components of receiver 106, for example, by MAC 132, e.g., if controller 130 is unable to determine that packet 200 (FIG. 2) is not intended to be received by receiver 108.

In some demonstrative embodiments, MAC 132 may determine whether or not packet 200 (FIG. 2) is intended to be received by receiver 108 by considering one or more elements included in second header 206 (FIG. 2). For example, MAC 132 may process and/or check at least one of RA 216 (FIG. 2), BSSID 218 (FIG. 2) and/or any other suitable field or value of second header 206 (FIG. 2).

In some demonstrative embodiments, MAC 132 may include any suitable lower MAC layer 138 and any suitable upper MAC layer 140. For example, lower MAC layer 138 may be implemented in micro-code ("uCode"), and upper MAC layer 140 may be implemented as part of a suitable driver of device 106.

In some demonstrative embodiments, lower MAC layer 138 may determine, based on second header 206 (FIG. 2) whether or not packet 200 (FIG. 2) is intended to be received by receiver 108. Lower MAC layer 138 may provide at least one feedback signal 113 to controller 130, e.g., indicating to controller 130 that packet 200 (FIG. 2) is not intended to be received by receiver 108.

In some demonstrative embodiments, lower MAC layer 138 may compare, for example, RA 216 (FIG. 2) to a MAC address of receiver 108. Lower MAC layer 138 may determine that packet 200 (FIG. 2) is not intended to be received by receiver 108 and send feedback signal 113 to controller 130 causing controller 130 to power down at least one component of PHY 134 and thus abort further processing of the remainder of packet 200 (FIG. 2), e.g., if RA 216 does not match the MAC address of receiver 108.

Additionally or alternatively, in some demonstrative embodiments, lower MAC layer 138 may check if RA 216 includes a broadcast address and, if so, lower MAC layer 138 may check BSSID 218 (FIG. 2). Lower MAC layer 138 may determine that packet 200 (FIG. 2) is not intended to be received by receiver 108 and send feedback signal 113 to controller 130 causing controller 130 to power down at least one component of PHY 134 and thus abort further processing of the remainder of packet 200 (FIG. 2), e.g., if BSSID 218 (FIG. 2) does not indicate a BSS, which includes and/or is associated with device 106.

Additionally or alternatively, in some demonstrative embodiments, lower MAC layer 138 may check if RA 216 is a multi-cast address and, if so, lower MAC layer 138 may check whether RA 216 includes a multicast address of a multicast group including receiver 108. Lower MAC layer 138 may determine that packet 200 (FIG. 2) is not intended to be received by receiver 108 and send feedback signal 113 to controller 130 causing controller 130 to power down at least one component of PHY 134 and thus abort further processing of the remainder of packet 200 (FIG. 2), e.g., if RA 216 includes a multicast address which does not include receiver 108, e.g., if BSSID 218 (FIG. 2) indicates a BSS, which does not include and/or is associated with device 106.

Additionally or alternatively, in some demonstrative embodiments, lower MAC layer 138 may determine that the processing of packet 200 (FIG. 2) is not to be aborted, e.g., thereby allowing PHY 134 to process the entire packet 200 (FIG. 2), if one or more predefined criteria are met. For example, lower MAC layer 138 may determine that the processing of packet 200 (FIG. 2) is not to be aborted if RA 216 (FIG. 2) matches the MAC address of receiver 108; if RA 216 (FIG. 2) is a broadcast address and BSSID 218 (FIG. 2) indicates a BSS, which includes and/or is associated with device 106; if RA 216 (FIG. 2) is a multicast address of a multicast group including receiver 108; if packet 200 (FIG. 2) includes a control frame, for example, as a Request to Send (RTS) frame, a Clear to Send (CTS) frame and/or Acknowledgement (ACK) frame, e.g., as described by the 802 standard and/or any other suitable standard; and/or if a parser (not shown) of lower MAC 138 is bypassed, e.g., when operating in a promiscuous mode.

It is noted, that MAC 132 may not be able to determine whether or not one or more portions of header 206 are corrupt. For example, RA 216 (FIG. 2) may be corrupt, e.g., including an erroneous RA, and MAC 132 may not be able to detect the corrupt RA 216 (FIG. 2). In such a situation, MAC 132 may determine whether or not packet 200 (FIG. 2) is intended to be received by receiver 108 based on the corrupt RA.

In one case, the corrupt RA may include an RA indicating that packet 200 (FIG. 2) is intended for receiver 108, e.g., although the actual, uncorrupt, RA may have indicated that packet 200 (FIG. 2) is not intended for receiver 108. This case, may have a relatively low likelihood, for example, a likelihood of $1-(2^{48}-1)/2^{48}$, assuming a 48-bit RA. In this case, receiver 108 may determine, based on header 206 (FIG. 2) that packet 200 (FIG. 2) is intended to be received by receiver 108, e.g., although packet 200 (FIG. 2) may actually not be intended to be received by receiver 108. As a result, receiver 108 may not abort processing the remainder of packet 200 (FIG. 2) by PHY 134, and packet 200 (FIG. 2) may "dropped" later, e.g., based on any suitable check, e.g., a frame check sequence (FCS).

In a second case, the corrupt RA may include an RA indicating that packet 200 (FIG. 2) is not intended for receiver 108, e.g., although the actual, uncorrupt, RA may have indicated that packet 200 (FIG. 2) is intended for receiver 108. In this case, receiver 108 may abort processing the remainder of packet 200 (FIG. 2) by PHY 134.

In some demonstrative embodiments, controller 130 may controllably power down one or more components of PHY 134, e.g., one or more components of RF portion 126 and/or BB portion 128, based on signals 111 and/or 113, for example, such that PHY 134 aborts processing of one or more remaining unprocessed portions of packet 200 (FIG. 2), for a power-down period. For example, if signals 111 and/or 113 indicate that packet 200 (FIG. 2) is not intended to be received by receiver 108, then controller 130 may controllably power down one or more components of PHY 134, e.g., one or more components of RF portion 126 and/or BB portion 128, such that PHY 134 aborts processing of header 206 (FIG. 2) and data portion 210 (FIG. 2). If signal 111 do not indicate that packet 200 (FIG. 2) is not intended to be received by receiver 108, while signal 113 do indicate that packet 200 (FIG. 2) is not intended to be received by receiver 108, then controller 130 may controllably power down one or more components of PHY 134, e.g., one or more components of RF portion 126 and/or BB portion 128, such that PHY 134 aborts processing of data portion 210 (FIG. 2).

In some demonstrative embodiments, receiver 108 may determine the power down period based on an anticipated remaining transmit time (TxTime) of packet 200 (FIG. 2). The precise calculation of the power down time period may enable the precise abortion of redundant packet processing by PHY 134 without or with minimal affect on the reception and processing of future packets.

In some demonstrative embodiments, controller 130 may calculate the power down period based on information included in the processed first header 204 (FIG. 2), for example, based on rate field 212 (FIG. 2) and/or length field 214 (FIG. 2), which may relate to a Physical layer Service Data Unit (PSDU) of packet 200 (FIG. 2). In one example, if packet 200 (FIG. 2) includes an aggregate MAC service data unit (A-MSDU), then the PSDU may include header 206 and an A-MSDU. In another example, if packet 200 (FIG. 2) includes an aggregate MAC protocol data unit (A-MPDU), then the PSDU may include a collection of one or more MAC protocol data units (MPDUs). In other embodiments, packet 200 may include any other suitable packet and/or format.

In some demonstrative embodiments, controller 130 may determine the power down period to correspond to an anticipated remaining duration of a remainder of packet 200 (FIG. 2), e.g., upon receiving signals 111 and/or 113 indicating that packet 200 (FIG. 2) is not intended to be received by receiver 108. For example, controller 130 may determine the power down period based on the duration of packet 200 (FIG. 2) and an elapsed time period since initial detection of packet 200 (FIG. 2) by receiver 108. For example, controller 130 may count the elapsed time since receiving packet 200 (FIG. 2).

In some demonstrative embodiments, controller 130 may determine the power down period based on duration field 220 (FIG. 2), e.g., if the transmission of packet 200 (FIG. 2) does not implement Transmit Opportunity (TxOP) termination. For example, MAC 132 may provide the value of duration field 220 (FIG. 2), e.g., as part of and/or together with signals 113. However, if header 206 is corrupt, e.g., as described above, then determining the power down period based on duration field 220 (FIG. 2) may result in an erroneous power down period.

In some demonstrative embodiments, header 206 (FIG. 2) may also include a check field 221 (FIG. 2), e.g., a Cyclic Redundancy Check (CRC) field, including a value, which enables detecting and error and/or corruption of header 206. According to these embodiments, upon receiving header 206 (FIG. 2), MAC 132 may determine whether or not header 206 (FIG. 2) is corrupt, e.g., based on check field 221 (FIG. 2). MAC 132 may extract duration field 220 (FIG. 2) from header 206 (FIG. 2) and provide MAC duration value of duration field 220 (FIG. 2) to controller 130, e.g., via signals 113, for example, if MAC 132 can determine that header 206 (FIG. 2) is not corrupt. According to these embodiments, the MAC duration value of duration field 220 (FIG. 2) may indicate a remaining TxOP duration after packet 200 (FIG. 2) is received. Controller 130 may determine the power down period, for example, by combining the MAC duration value and the anticipated remaining duration of packet 200 (FIG. 2). For example, controller 130 may determine the power down period to be equal to a sum of the MAC duration value and the anticipated remaining duration of packet 200 (FIG. 2).

In some embodiments, controller 130 may determine the power down period based on information other than duration field 220 (FIG. 2), for example, one or more other elements of header 204 and/or header 206, e.g., as described herein. For example, if the transmission of packet 200 (FIG. 2) does implement TxOP termination then and controller 130 determines the power down period based on duration field 220 (FIG. 2), then receiver 108 may not be able to receive an indication, e.g., a suitable Contention-Free end (CF-end) frame, that the TxOP is to be terminated, prior to the end of the TxOP indicated corresponding to duration field 220 (FIG. 2).

In some demonstrative embodiments, controller 130 may controllably power up the powered down components, e.g., prior to and/or at then end of the power down period, such that PHY 134 may process signals of a successive packet, as described in detail below.

In some demonstrative embodiments, powering up some components of PHY 134, e.g., digital components of BB portion 128, may be responsive relatively immediately. Accordingly, controller 130 may power up these "immediate response" components substantially at the end of the duration of packet 200 (FIG. 2). However, powering down and/or powering up of other components of PHY 134, especially components of RF portion 126, may not be immediately responsive, due to the nature of powering down/up of certain components, e.g., analog components of RF portion 126. For example, such "delayed response" components may require a power-up time period for powering up. Accordingly, receiver 108 may be capable of determining the power down period of time prior to initiating the power up of the delayed-response components, based on a combination of the duration of packet 200 (FIG. 2) and the power-up period, e.g., as described below. For example, controller 130 may initiate the powering up of the delayed response components prior to the end of the duration of packet 200 (FIG. 2), e.g., at least the power-up period, prior to the end of the duration of packet 200 (FIG. 2), such that the delayed-response components may be powered up when the duration of packet 200 (FIG. 2) has ended. For example, controller 130 may generate signals 107 and 109 to power down components of RF portion 126 and BB portion 128, e.g., substantially simultaneously; while controller 130 may generate signals 107 to power up components of RF portion 126 at a first time, e.g., the power-up period prior to the end of the duration of packet 200 (FIG. 2), and to generate signals 109 to power up components of BB portion 128 at a second, later, time, e.g., at the end of the duration of packet 200 (FIG. 2).

Figure 3:
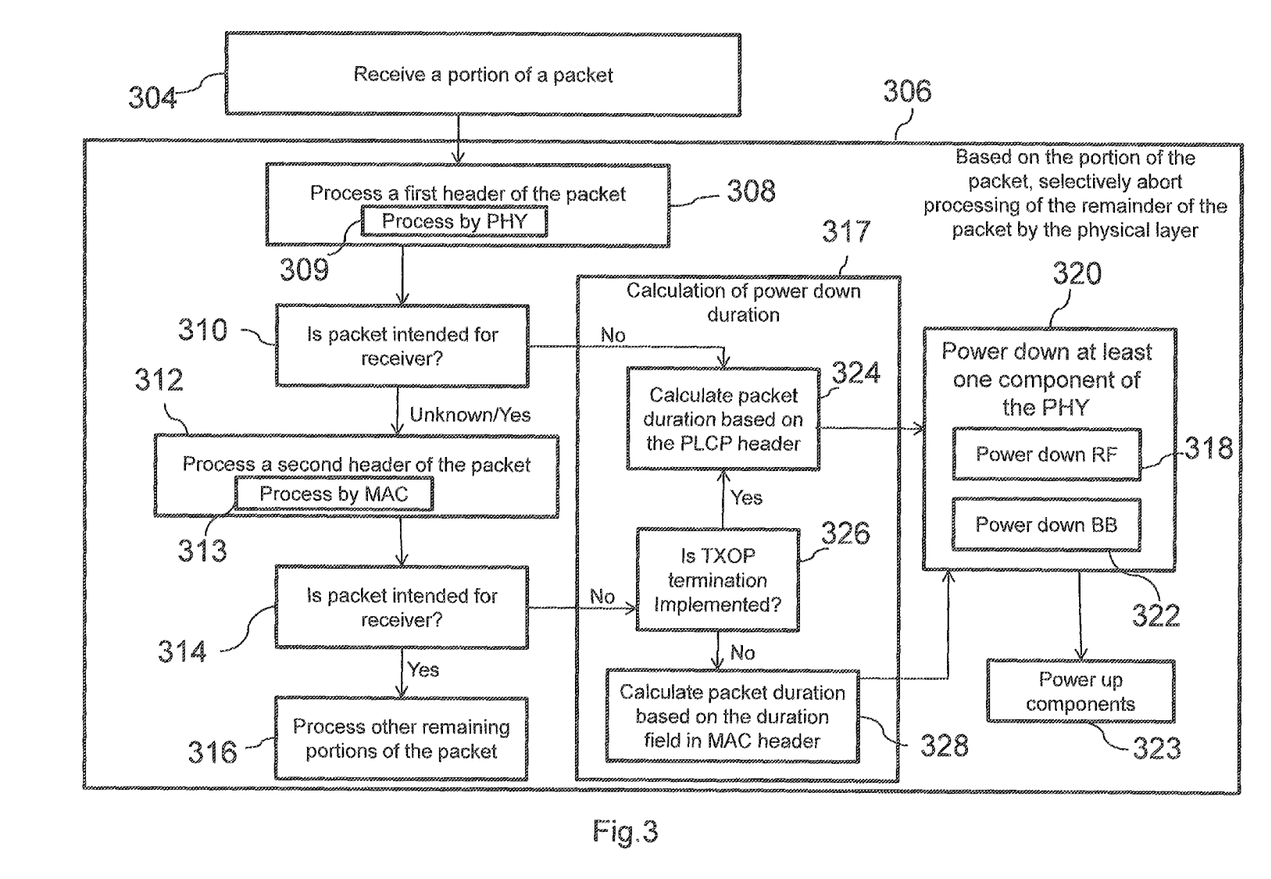
FIG. 3 is a schematic flow-chart illustration of a method of selectively aborting reception of wireless communication packets, in accordance with some demonstrative embodiments.

Reference is now made to FIG. 3, which schematically illustrates a method of selectively aborting reception of wireless communication packets, in accordance with some demonstrative embodiments. In some demonstrative embodiments, one or more of the operations of the method of FIG. 3 may be performed by a wireless communication device, for example, wireless communication device 106 (FIG. 1), a receiver, e.g., receiver 108 (FIG. 1) and/or any other wireless communication device capable of receiving wireless communication packets.

As indicated in block 304, the method may include receiving a portion of a packet by a receiver. For example, receiver 108 (FIG. 1) may receive signals of at least part of leading portion 208 (FIG. 2) of packet 200 (FIG. 2), e.g., as described above.

As indicated in block 306, the method may include selectively aborting processing of a remainder of the packet by a PHY of the receiver, based on the processed portion. For example, based on header 204 (FIG. 2) and/or header 206 (FIG. 2), receiver 108 (FIG. 1) may selectively abort processing of remaining portions of packet 200 (FIG. 2) by PHY 134 (FIG. 1), e.g., as described above.

As indicated in block 308, the method may include processing a first header of the packet. As indicated at block 309, processing the first header may include processing a PHY header by the PHY. For example, PHY 134 (FIG. 1) may process header 204 (FIG. 2), e.g., as described above.

As indicated in block 310, the method may include determining whether the packet is intended to be received by the receiver based on the first header. For example, controller 130 (FIG. 1) may determine whether or not packet 200 (FIG. 2) is to be received by receiver 108 (FIG. 1) based on signal 111 (FIG. 1), e.g., as described above.

As indicated in block 312, the method may include processing a second header of the packet, e.g., if it cannot be determined, based on the first header, that the packet is not intended to be received by the receiver. As indicated in block 313, processing the second header may include processing a MAC header by a MAC of the receiver. For example, MAC 134 (FIG. 1) may process header 206 (FIG. 2), e.g., after being initially processed by PHY 132 (FIG. 1), as described above.

As indicated in block 314, the method may include determining whether or not the packet is intended to be received by the receiver based on the second header. For example, MAC 132 (FIG. 1) may determine whether or not packet 200 (FIG. 2) is intended to be received by receiver 108 (FIG. 1), e.g., based on header 206, as described above.

As indicated in block 316, the method may include processing other remaining portions of the packet, e.g., if criteria to abort processing of the packet are not met. For example, if it has not been determined, as explained above, by either PHY 134 (FIG. 1) or MAC 132 (FIG. 1), that packet 200 (FIG. 2) is not intended for reception by receiver 108 (FIG. 1), then the remaining portions of packet 200 (FIG. 2), which have not been processed, may continue to be received and processed by PHY 134 (FIG. 1) and MAC 132 (FIG. 1).

As indicated in block 317, the method may include determining a power down period of time, for example, if it is determined, e.g., based on the first and/or second headers, that the packet is not intended to be received by the receiver. The power down period may be determined, for example, based on the received portion of the packet, e.g., as described below.

As indicated in block 324, determining the power down period may include determining the power down period based on a PLCP header. For example, controller 130 (FIG. 1) may determine the power down period based on header 204 (FIG. 2), e.g., as described above.

As indicated in block 326, the method may include determining whether or not TxOP termination is implemented. For example, a device of system 100 (FIG. 1), for example, an AP, e.g., which may be implemented as part of device 122 (FIG. 1) and/or any other device, may use suitable signals, e.g., frames and/or packets, to indicate to device 106 whether or not TxOP may be implemented. In one example, the AP may transmit a beacon including a suitable indication, e.g., a bit having a predefined value, to indicate that a wireless communication device receiving the beacon is not to implement TxOP termination.

As indicated in block 328, determining the power down period may include determining the power down period based on a MAC duration field in the second header, e.g., if TXOP termination is not implemented. For example, controller 130 (FIG. 1) may determine the power down period based on duration field 220 (FIG. 1), e.g., as described above.

As indicated in block 320, the method may include powering down at least one component of the PHY, for the power down period. For example, controller 130 (FIG. 1) may power down one or more components of PHY 134 (FIG. 1) for the power down period, e.g., as described above.

As indicated at block 318, powering down the one or more components may include powering down one or more RF components. For example, controller 130 (FIG. 1) may power down one or more components of RF portion 126 (FIG. 1) for the power down period, e.g., as described above.

As indicated at block 322, powering down the one or more components may include powering down one or more BB components. For example, controller 130 (FIG. 1) may power down one or more components of BB portion 128 (FIG. 1) for the power down period, e.g., as described above.

As indicated at block 323, the method may include powering up one or more of the components, which were powered down. For example, controller 130 (FIG. 1) may power up one or more of the components of BB portion 128 (FIG. 1) and/or RF portion 126 (FIG. 1), for example, prior to and/or at the end of the power down period, e.g., as described above.

Figure 4A:
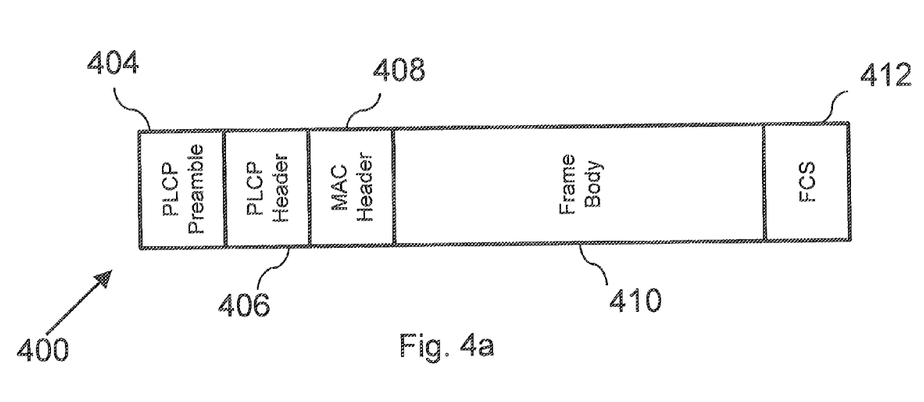
FIG. 4a is a schematic block diagram illustration of a first type of a wireless communication packet to be received, in accordance with some demonstrative embodiments.
Figure 4B:
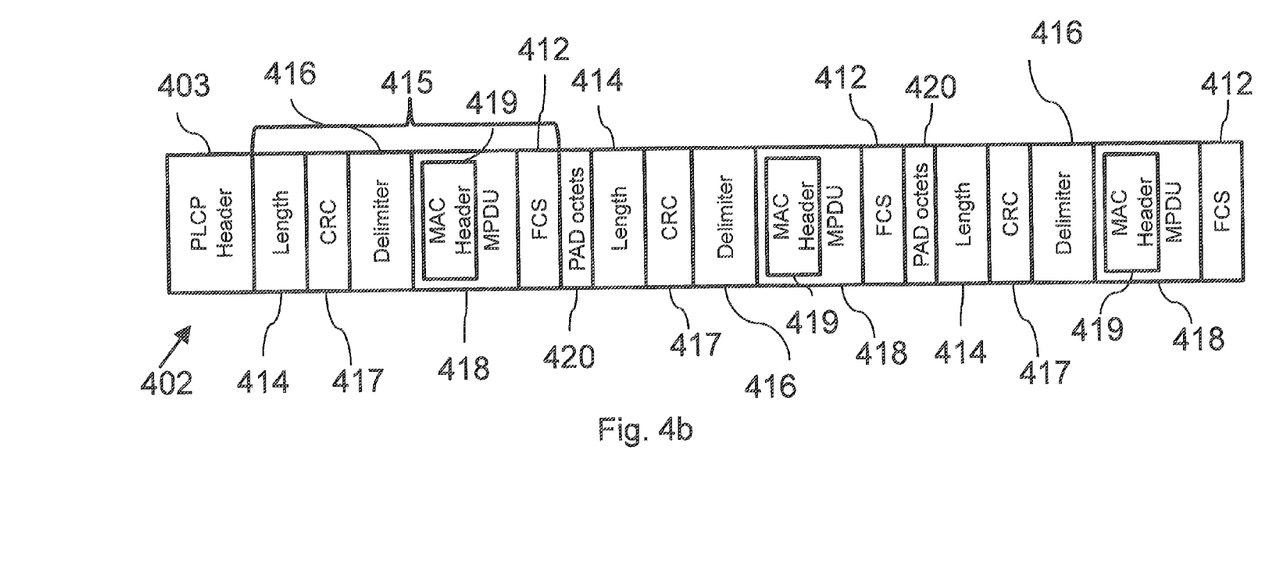
FIG. 4b is a schematic block diagram illustration of a second type of a wireless communication packet to be received, in accordance with some demonstrative embodiments.

Reference is now made to FIGS. 4*a* and 4*b*, which schematically illustrate block diagrams of two exemplary types of packets to be received, in accordance with some demonstrative embodiments. Any other suitable packets and/or packet formats may be received and/or processed in accordance with other embodiments.

FIG. 4a illustrates a demonstrative frame format of a Physical Packet Data Unit (PPDU) 400, e.g., in accordance with the IEEE 802.11 standard. PPDU 400 may include a PLCP preamble 404, a first header 406, for example, a PLCP header, a second header 408, for example, a MAC header, a frame body 410, e.g., including data, and a FCS field 412.

In some demonstrative embodiments, header 406 may include rate field 212 (FIG. 2) representing a data rate of PPDU 400, and length field 214 (FIG. 2) specifying a length of a MPDU of PPDU 400.

According to these embodiments, PHY 134 (FIG. 1) may process header 406 to determine, e.g., based on the rate field, whether or not PPDU 400 is intended to be received by receiver 108 (FIG. 1), e.g., as described above. Controller 130 (FIG. 1) may power down one or more components of PHY 134 (FIG. 1), e.g., upon determining that PPDU 400 is not intended to be received by receiver 108 (FIG. 1). PHY 134 (FIG. 1) may continue to process header 408 and provide the processed header 408 to MAC 132 (FIG. 1), e.g., if PHY 134 (FIG. 1) cannot determine that PPDU 400 is not intended to be received by receiver 108 (FIG. 1). Lower MAC layer 138 (FIG. 1) may determine whether or not PPDU 400 is intended to be received by receiver 108 (FIG. 1), e.g., based on header 408. Lower Mac layer 138 (FIG. 1) may cause controller 130 (FIG. 1) to power down one or more components of PHY 134 (FIG. 1), e.g., upon determining that PPDU 400 is not intended to be received by receiver 108 (FIG. 1). PHY 134 (FIG. 1) and MAC 132 (FIG. 1) may continue to process other portions of PPDU 400, e.g., if lower MAC layer 138 (FIG. 1) cannot determine that PPDU 400 is not intended to be received by receiver 108 (FIG. 1).

FIG. 4b illustrates a demonstrative frame format of an A-MPDU 402, e.g., in accordance with the IEEE 802.11n standard. A-MPDU 402 may include a first header 403, e.g., a PLCP header, followed by one or more A-MPDU subframes 415. A-MPDU subframe 415 may include a length field 414, a length CRC field 417, a delimiter signature 416, a MPDU 418, and an FCS 412, optionally followed by one or more padding bits 420. Length field 414 may specify a length of MPDU 418, and CRC field may include a value for checking length field 414. MPDU 418 may include a MAC header 419, e.g., analogous to MAC header 206 (FIG. 2).

According to these embodiments, PHY 134 (FIG. 1) may process header 403 to determine, e.g., based on the rate field, whether or not A-MPDU 402 is intended to be received by receiver 108 (FIG. 1), e.g., as described above. Controller 130 (FIG. 1) may power down one or more components of PHY 134 (FIG. 1), e.g., upon determining that A-MPDU 402 is not intended to be received by receiver 108 (FIG. 1). PHY 134 (FIG. 1) may determine the duration of A-MPDU 402 based on PLCP header 403. PHY 134 (FIG. 1) may then process a MAC header 419 of a first MPDU 418 of A-MPDU 402 and provide the processed MAC header 419 to MAC 132 (FIG. 1). MAC 132 (FIG. 1) may determine whether or not A-MPDU 402 is intended to be received by receiver 108 (FIG. 1), e.g., based on header 419, for example, while PHY 134 (FIG. 1) processes a remainder of MPDU 418. MAC 132 (FIG. 1) may cause controller 130 (FIG. 1) to power down one or more components of PHY 134 (FIG. 1), e.g., upon determining that A-MPDU 402 is not intended to be received by receiver 108 (FIG. 1). Controller 130 (FIG. 1) may power down the one or more components of PHY 134 (FIG. 1) for the entire duration of A-MPDU 402, based on the determination of MAC 132 with respect to first MPDU 418, e.g., since all MPDUs 418 of A-MPDU 402 may have the same RA. PHY 134 (FIG. 1) and MAC 132 (FIG. 1) may continue to process other portions of A-MPDU 402, e.g., if MAC 132 (FIG. 1) cannot determine that A-MPDU 402 is not intended to be received by receiver 108 (FIG. 1). In one example, A-MPDU 402 may have a length of 32 Kilobytes, and header 403 may have a length of less than 50 bytes. Accordingly, components of PHY 134 (FIG. 1) may be powered down for almost the entire duration of A-MPDU 402, e.g., for more than 90% of the duration of A-MPDU 402, if, for example, PHY 134 (FIG. 1) determines that A-MPDU 402 is not intended to be received by receiver 108 (FIG. 1) based on header 403.

Figure 5:
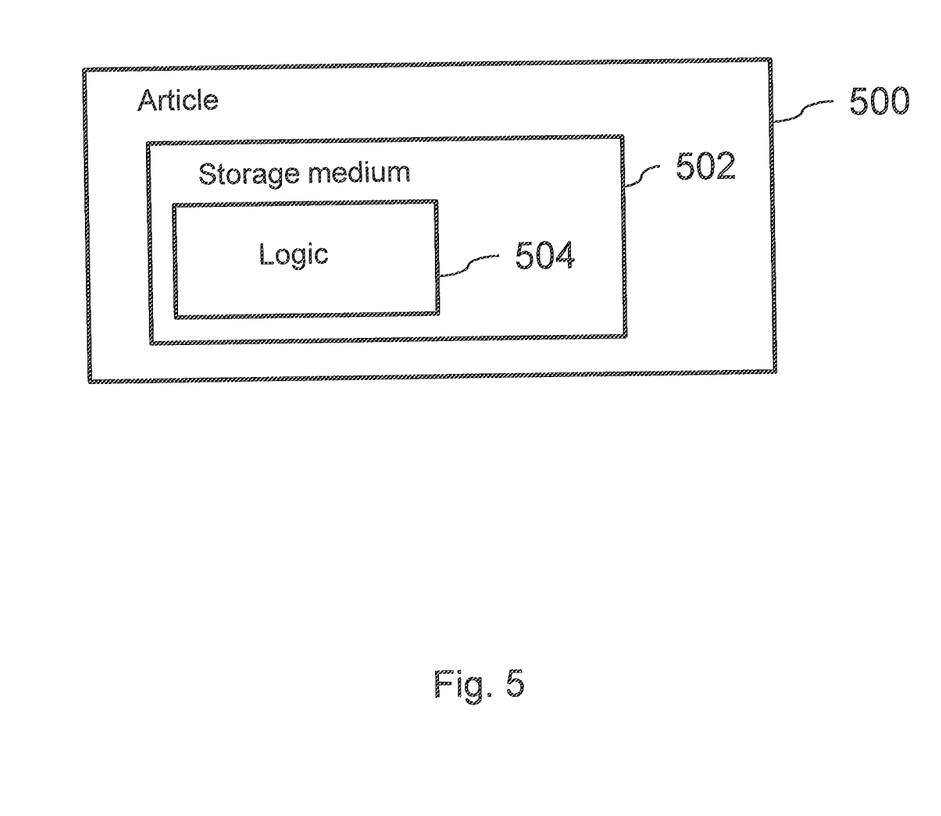
FIG. 5 is a schematic illustration of an article of manufacture, in accordance with some demonstrative embodiments.

Reference is made to FIG. 5, which schematically illustrates an article of manufacture 400, in accordance with some demonstrative embodiments. Article 500 may include a machine-readable storage medium 502 to store logic 504, which may be used, for example, to perform at least part of the functionality of receiver 108 (FIG. 1) and/or wireless communication device 106 (FIG. 1); and/or to perform one or more operations of the method of FIG. 3.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a receiver, including a physical (PHY) layer and a Media Access Control (MAC) layer, to process signals of a wireless communication packet, the packet including a PHY header and a MAC header,
wherein the PHY layer is to at least partially process a portion of the PHY header to determine, based on the portion of the PHY header, whether the packet is to be received by the receiver and, if the packet is not to be received by the receiver, to abort processing of the packet,
wherein if processing is not to be aborted based on the portion of the PHY header, the MAC layer is to determine based on the MAC header whether the packet is to be received by the receiver and, if the packet is not to be received by the receiver, the receiver is to abort processing of the packet,
and wherein the receiver is to determine whether Transmit Opportunity (TxOp) termination is to be implemented or not based on an indication in a beacon, the receiver to abort processing of the packet by powering down one or more receiver components for a power-down period, the one or more receiver components comprising at least one radio-frequency (RF) component having a power-up delay period, the receiver to determine the power-down period based at least on the power-up delay period, the receiver to determine the power-down period based at least on a Physical Layer Convergence Procedure (PLCP) header when TxOp termination is implemented, and to determine the power-down period based at least on a duration field of the MAC header when TxOp termination is not implemented.

2. The device of claim 1, wherein the physical layer is to determine whether the packet is to be received by the receiver based on a Physical Layer Convergence Protocol (PLCP) header.

3. The device of claim 1, wherein the receiver is to power-up the one or more receiver components after the power-down period.

4. The device of claim 1, wherein the one or more receiver components include at least one RF component of the physical layer.

5. The device of claim 1, wherein the one or more receiver components include at least one baseband (BB) component of the physical layer.

6. The device of claim 1 including one or more antennas, a memory and a processor.

7. A method to be performed by a receiver including a physical (PHY) layer and a Media Access Control (MAC) layer, to process signals of a wireless communication packet, the packet including a PHY header and a MAC header, the method comprising:
determining whether Transmit Opportunity (TxOp) termination is to be implemented or not based on an indication in a beacon;
at least partially processing a portion of the PHY header to determine, based on the portion of the PHY header, whether the packet is to be received by the receiver and, if the packet is not to be received by the receiver, aborting processing of the packet; and
if processing is not to be aborted based on the portion of the PHY header, determining based on the MAC header whether the packet is to be received by the receiver and, if the packet is not to be received by the receiver, aborting processing of the packet,
wherein aborting processing of the packet comprises determining a power-down period based at least on a power-up delay period of at least one radio-frequency (RF) component of the receiver, and based at least on a Physical Layer Convergence Procedure (PLCP) header when TxOp termination is implemented, or based at least on a duration field of the MAC header when TxOp termination is not implemented, and powering down one or more receiver components for the power-down period.

8. The method of claim 7 comprising powering-up the one or more receiver components after the power-down period.

9. The method of claim 7, wherein the one or more receiver components include at least one RF component of the physical layer.

10. The method of claim 7, wherein the one or more receiver components include at least one baseband (BB) component of the physical layer.

11. A wireless communication device comprising:
a memory;
a processor;
an input unit;
an output unit;
at least one antenna to receive signals of a wireless communication packet, the packet including a physical (PHY) header and a Media Access Control (MAC) header; and
a receiver, including a physical (PHY) layer and a Media Access Control (MAC) layer, to process the signals of the wireless communication packet, the PHY layer is to at least partially process a portion of the PHY header to determine, based on the portion of the PHY header, whether the packet is to be received by the receiver and, if the packet is not to be received by the receiver, to abort processing of the packet,
wherein if processing is not to be aborted based on the portion of the PHY header, the MAC layer is to determine based on the MAC header whether the packet is to be received by the receiver and, if the packet is not to be received by the receiver, the receiver is to abort processing of the packet,
and wherein the receiver is to determine whether Transmit Opportunity (TxOp) termination is to be implemented or not based on an indication in a beacon, the receiver to abort processing of the packet by powering down one or more receiver components for a power-down period, the one or more receiver components comprising at least one radio-frequency (RF) component having a power-up delay period, the receiver to determine the power-down period based at least on the power-up delay period, the receiver to determine the power-down period based at least on a Physical Layer Convergence Procedure (PLCP) header when TxOp termination is implemented, and to determine the power-down period based at least on a duration field of the MAC header when TxOp termination is not implemented.

12. The wireless communication device of claim 11, wherein the receiver is to power-up the one or more receiver components after the power-down period.

13. The wireless communication device of claim 11, wherein the one or more receiver components include at least one RF component of the physical layer.

14. The wireless communication device of claim 11, wherein the one or more receiver components include at least one baseband (BB) component of the physical layer.

15. The wireless communication device of claim 11, wherein the signals of the packet comprise Orthogonal Frequency Division-Multiplexed (OFDM) signals.

16. The wireless communication device of claim 11 being a Smartphone, a tablet or a router.

17. A product including a tangible computer-readable non-transitory storage medium comprising computer-executable instructions operable to, when executed by a computer processor, enable the computer processor to implement operations at a receiver including a physical (PHY) layer and a Media Access Control (MAC) layer, to process signals of a wireless communication packet, the packet including a PHY header and a MAC header, the operations comprising:

determining whether Transmit Opportunity (TxOp) termination is to be implemented or not based on an indication in a beacon;

at least partially processing a portion of the PHY header to determine, based on the portion of the PHY header, whether the packet is to be received by the receiver and, if the packet is not to be received by the receiver, aborting processing of the packet; and  if processing is not to be aborted based on the portion of the PHY header, determining based on the MAC header whether the packet is to be received by the receiver and, if the packet is not to be received by the receiver, aborting processing of the packet,  wherein aborting processing of the packet comprises determining a power-down period based at least on a power-up delay period of at least one radio-frequency (RF) component of the receiver, and based at least on a Physical Layer Convergence Procedure (PLCP) header when TxOp termination is implemented, or based at least on a duration field of the MAC header when TxOp termination is not implemented, and powering down one or more receiver components for the power-down period.

18. The product of claim 17, wherein the operations comprise powering-up the one or more receiver components after the power-down period.

19. The product of claim 17, wherein the one or more receiver components include at least one RF component of the physical layer.

20. The product of claim 17, wherein the one or more receiver components include at least one baseband (BB) component of the physical layer.

* * * * *